US006757253B1

United States Patent
Cooper et al.

(10) Patent No.: US 6,757,253 B1
(45) Date of Patent: Jun. 29, 2004

(54) SPECTRUM MANAGEMENT METHOD FOR A CABLE DATA SYSTEM

(75) Inventors: Michael Jaimie Cooper, Marietta, GA (US); John L. Moran, III, Millville, MA (US); Mark Miner, Foxborough, MA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/580,804

(22) Filed: May 30, 2000

(51) Int. Cl.$^7$ .............................. H04J 1/16; H04J 3/14; G01R 31/08; H04L 1/00; H04L 12/26
(52) U.S. Cl. .................. 370/241; 370/225; 725/107; 455/62
(58) Field of Search ............................ 370/241, 248, 370/249, 252, 343–344, 464, 480–481, 489–490; 455/5.1, 62, 3.06, 3.05; 348/180–181, 192–193; 725/107, 111, 124, 125

(56) References Cited

U.S. PATENT DOCUMENTS

| 5,010,329 | A | * | 4/1991 | Nagakura ............... 370/395.1 |
| 5,225,902 | A | * | 7/1993 | McMullan, Jr. ............ 725/121 |
| 5,608,727 | A | | 3/1997 | Perreault et al. |
| 5,835,125 | A | * | 11/1998 | Bhagavath ................ 725/127 |
| 5,862,451 | A | * | 1/1999 | Grau et al. ................ 725/116 |
| 5,943,604 | A | * | 8/1999 | Chen et al. ................ 455/5.1 |
| 6,230,326 | B1 | * | 5/2001 | Unger et al. .............. 725/111 |
| 6,385,773 | B1 | * | 5/2002 | Schwartzman et al. ..... 725/124 |
| 6,549,520 | B1 | * | 4/2003 | Gross et al. .............. 370/242 |
| 6,588,016 | B1 | * | 7/2003 | Chen et al. ............... 725/111 |
| 6,594,305 | B1 | * | 7/2003 | Roeck et al. .............. 375/222 |
| 2002/0056132 | A1 | * | 5/2002 | Wilson ..................... 725/118 |

* cited by examiner

Primary Examiner—Seema S. Rao
Assistant Examiner—Kevin C. Harper
(74) Attorney, Agent, or Firm—Caroline Coker

(57) ABSTRACT

In a cable modem system a method is provided for continuously monitoring the upstream channel to assess what unused upstream channels will better support data communication in the event that an active upstream channel degrades, with monitoring of the upstream path by using passive or unused channels not impacting active data transfer. In one embodiment, a single spectrum assessment receiver polls cable modems at various taps and has the selected modem retune itself to an unused channel and transmit a reference signal back to the spectrum assessment receiver. An analysis is made and an impaired active channel is identified to ascertain if it has degraded to an unacceptable level. If so, it is switched or hopped to this unused channel if by switching an improvement can be realized. Polling is accomplished by selecting the modem at the worst performing tap and ascertaining after one or more retunes which unused channel is best. The quality of all of the taps is maintained in a continuously-updated table to permit proper tap/modem selection.

16 Claims, 6 Drawing Sheets

SPECTRUM MANAGEMENT METHOD FOR A CABLE DATA SYSTEM

FIELD OF INVENTION

This invention relates to telecommunications, and more specifically to a spectrum management method for use with cable modems.

BACKGROUND OF THE INVENTION

Within recent years, Cable TV companies have expanded their product offerings beyond traditional cable TV video services to include such offerings as internet data, voice, both switched circuit and IP, and active gaming services. Further, in an effort to remove the heavy cost of equipment from their balance sheets, these companies are attempting to move the market toward a retail purchase model of most in-home equipment.

As a result of this effort, cable companies allied themselves together to drive the development of the Data-Over-Cable Service Interface Specifications, DOCSIS, standards. The goal of this effort was to allow many vendors to produce equipment that would interoperate regardless of the manufacturer. Achieving this goal would greatly assist the cable companies in moving the market toward a retail model where end users purchase their own equipment. This means that modems would work in any cable infrastructure. In addition, it addressed a historical problem for cable companies in that they were no longer tied to a single source manufacturer for infrastructure equipment.

In order to provide data services to end customers, data must be able to travel in both directions: from the "internet" to the customer, commonly called the forward-path or downstream, and from the customer to the "internet", commonly called the return-path or upstream. A substantial portion of the DOCSIS specification is dedicated to defining the protocols which are used to support providing data and Voice over IP services in both directions. However, one serious omission is present within the DOCSIS specification.

The forward-path direction of the Cable TV Plant functions as a fairly clean environment. This is entirely due to the fact that the traditional television set receiver utilizing an analog video demodulator requires a very high Carrier-to-Noise ratio, C/N, to produce a quality picture that satisfies the customer. Thus the net result regarding the forward path direction is a Carrier-to-Noise ratio which is sufficiently high enough to support both of the downstream DOCSIS digital modulation schemes, i.e. 64QAM and 256QAM.

The return-path on the other hand is a very hostile environment. The return path direction is not monitored by each household monitor for signal quality as is the case in the Forward Path direction. In essence, the only receivers available in the return path are the few Cable Modem Termination System, CMTS, digital receivers located at the CATV Head-end.

The hostility of the return path is a result of many factors. Since the CATV network today utilizes a tree and branch topology, there are numerous return path branches that are combined prior to the CMTS digital demodulator receiving the signal. Since it is a tree and branch topology design, all signals, whether they are Ingress Noise, Impulsive Noise, Continuous Wave, CW, type noise such as generated by Shortwave radio, or burst coherent signals such as generated by amateur radio and Citizens Band radio, all are combined prior to arriving at the CMTS digital receiver.

Because of the multiple path combining at the CMTS receiver and lack of customer complaints to the Cable TV operators to improve the signal path, the return path is extremely hostile to any type of communications transmission. More importantly, wideband digitally modulated signals are constrained to operate under the DOCSIS communications protocol. This means that burst transmission TDMA multiplexing is particularly vulnerable. Given the fact that there has not been a multitude of customers to serve as test sets, and given the fact that coaxial cable in any Cable TV network is optimized for the forward path direction, it should not come as too much of a surprise that the return path signal quality metrics are effectively still in their infancy.

Not only does the return path suffer from the summation or combining of return path branches, it also suffers from the fact that the return path has largely never been evaluated for known steady impairments such as micro-reflections, group delay, and system non-linearity. While some of these impairments such as micro-reflections and group delay could reasonably be controlled with proper return path alignment techniques such as a wideband sweep alignment technique, the impact due to non-linearity is generally speaking not well understood, and therefore continues to be largely ignored.

While the DOCSIS specification provides for a great deal of flexibility relative to the type of modulation scheme, symbol rates, degree of forward error correction, and frequency selection which may be used in the return-path, this protocol has failed to put the necessary provisions within the specification to allow for dynamically monitoring the return path-spectral quality in a timely fashion and adapting the return-path so as to maximize the data service provided within these hostile environments.

Thus, the hostile nature of the return-path makes spectrum management an absolute necessity, especially when considering such QOS-sensitive data services as Voice over IP. When constrained by the DOCSIS protocol, significant delays and data throughput impacts will be experienced as a result of probing the return-path spectrum. To date, no system has been developed which reduces these delays to adequate levels.

SUMMARY OF THE INVENTION

In order to monitor the spectral quality of the return path, signal-to-noise-ratio measurements must be performed which reflect both active signal noise characteristics as well as signal distortion impacts. Assessing signal distortion impact requires that a transmit burst of adequate duration and spectral quality be provided from various points within the cable plant infrastructure.

The DOCSIS specification does not support the functionality to allow modems to be forced to transmit the required signal on a frequency of interest in a timely manner. Further, the DOCSIS specification allows for a large channel retune time, in excess of 100 milliseconds, before being required to transmit on the return path. When taken together, these two factors result in a drastic impact on active data services when attempting to assess alternate spectral areas.

If an effort is made to monitor the spectral quality continually, then maximum achievable bit rates will be impacted. Similarly, if these assessments are only performed when the active communication channel degrades, then a large dropout of service will result as the system attempts to evaluate a significant area of spectrum before adapting the return-path configuration. As quality-of-service sensitive data services such as Voice-over-IP increase in deployment, the ability of the system to automatically respond to dynamic-hostile environments in a timely fashion will become even more critical.

One solution to this problem is when an active channel degrades, randomly hop to another section of the spectrum in hopes that it can support the data service, a trial-and-error approach which has serious consequences when the new spectrum is not capable of supporting the data traffic.

In order to be able to reliably hop to a so-called "clean channel" when an actual channel becomes degraded, in the subject method unused portions of the return path spectrum are continuously monitored in the background to be able to ascertain channel quality. This is accomplished through the use of a single parallel receiver which polls the cable modems at various taps. When an active channel becomes degraded, a reference table of unused upstream channels and their signal characteristics is consulted. When a suitable channel is found, the active channel is switched to this one. It will be noted that selecting the unused upstream spectrum for monitoring permits simultaneous data transmission on the active channels.

In order to monitor the unused portion of the spectrum, a polling signal is transmitted to a modem selected to transmit a reference signal on an unused upstream channel. The reference signal is such as to support both active noise and signal distortion measurements in the upstream direction. In order to transmit the reference signal, the selected modem is retuned to the unused channel. Thereafter the parallel receiver is used to measure various parameters of the unused channel. These parameters may include: slicer error, amplitude distortion, phase distortion, and power spectral noise characteristics as described in U.S. patent application Ser. No. 09/470,890 filed Dec. 22, 1999, entitled METHOD AND APPARATUS FOR AUTOMATED CORRELATION OF DIGITAL MODULATION IMPAIRMENT assigned to the assignee hereof and incorporated herein by reference; and Docket Number PD05944AM, U.S. patent application Ser. No. not available, filed May 15, 2000 entitled SLICED BANDWIDTH DISTORTION PREDICTION assigned to the assignee hereof and incorporated herein by reference.

The resulting measurement permits reassigning the active channel to this unused channel assuming the unused channel is better than the degraded one. The measurement is based on unused spectrum. In one embodiment, the modem selected depends on modem service activity and tap location. The selected modem will be from the worst performing tap. Historically, the worst performing taps in each coaxial run tend to be the lower loss taps. How the worst performing taps are ascertained will be described hereinafter in a section entitled Tap Performance.

If a good upstream channel can be found for the modem at this worst tap, then in all probability it will be good for modems at other better performing taps.

The subject invention thus provides for an approach which allows the return-path spectrum to be monitored "in the background". As will be seen, the subject approach is compatible with the DOCSIS protocol. In one embodiment, monitoring is accomplished by the use of a single parallel receiver while not degrading the services provided by the cable operator. Thus, there is no impact on active data services. In addition, since the spectral monitoring is constantly being performed, the subject system provides a mechanism by which a backup "clean" channel is found and used immediately upon active channel degradation. Further, the subject invention does not require any additional devices beyond DOCSIS cable modems to be installed within the cable plant.

Note that U.S. patent application Ser. No. 5,608,727 issued Mar. 4, 1997 for "Method and System for Management of Frequency Spectrum Among Multiple Applications on a Shared Medium" assigned to the assignee hereto and incorporated herein by reference describes a system for frequent spectrum management; and that U.S. patent application Ser. No. 09/052,224 filed Mar. 31, 1998, entitled "System, Device, and Method for Selecting A Channel in A Multichannel Communication Network" describes a system for channel selection based upon a reference signal.

In summary, in a cable modem system a method is provided for continuously monitoring the upstream channel to assess what unused upstream channels will better support data communication in the event that an active upstream channel degrades, with monitoring of the upstream path by using passive or unused channels not impacting active data transfer. In one embodiment, a single spectrum assessment receiver polls cable modems at various taps and has the selected modem retune itself to an unused channel and transmit a reference signal back to the spectrum assessment receiver. An analysis is made and an impaired active channel is identified to ascertain if it has degraded to an unacceptable level. If so, it is switched or hopped to this unused channel if by switching an improvement can be realized. Polling is accomplished by selecting the modem at the worst performing tap and ascertaining after one or more retunes which unused channel is best. The quality of all of the taps is maintained in a continuously-updated table to permit proper tap/modem selection.

BRIEF DESCRIPTION OF THE DRAWINGS

These and other features of the Subject Invention will be better understood in connection with the Detailed Description in conjunction with the Drawings of which.

DETAILED DESCRIPTION

Figure 1:
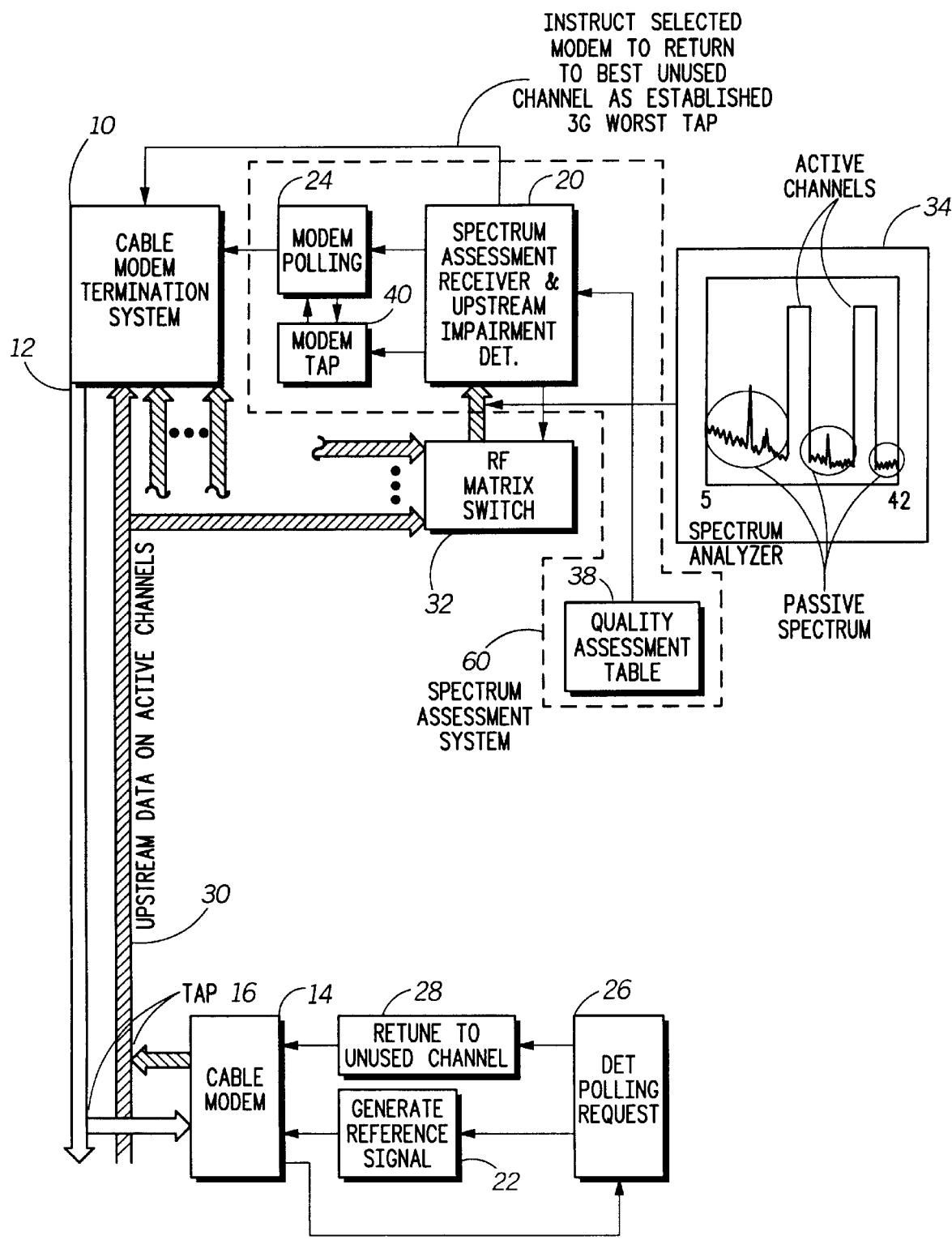
FIG. 1 is a block diagram of the subject system illustrating the utilization of a spectrum assessment receiver in combination with a polling system to poll cable modems for the purpose of having the cable modems retune themselves to unused channels and generate reference signals for the measurement of the quality of unused upstream channels.

Referring now to FIG. 1 in a typical cable modem system there is a cable modem termination system 10 which is coupled via cable 12 in the downstream direction to a number of cable modems, one modem being illustrated at 14. It will be appreciated that this cable modem is tapped or coupled to the forward and return path at a tap 16.

In a usual cable plant there may be as many as 1500 modems coupled to the cable, with the downstream data applied via the cable to each of the cable modems. The downstream channels generally reside in a region of the electromagnetic spectrum between 80 MHz and 1000 MHz and are interleafed with the traditional TV channels in most cable plants. It will be appreciated that the DOCSIS protocols were designed for this frequency spectrum, with the assignment of the active channels being well described by the DOCSIS protocol.

However in the upstream direction, the direction from a cable modem to the cable modem terminal system, the portion of the electromagnetic spectrum utilized is between 5 MHz and 42 MHz for American systems and between 5 MHz and 65 MHz for European systems. This particular frequency spectrum is a very noisy portion of the cable plant in which noise is easily injected into the active upstream channels by such things as hairdryers, home appliances and indeed many of the radiation sources which are common within a home or an apartment. Also there is a portion of the plant where non-ideal plant devices introduce such signal distortions as group delay, phase and amplitude distortions, and microreflections.

The result of the injection of this noise and signal distortion is that the upstream active channels may become corrupted or degraded to a large extent. The amount of noise and therefore the amount of data degradation is not necessarily steady, but may be intermittent depending on the noise sources and when they are active. It is therefore incumbent upon a spectrum management system to be able to ascertain when a given active upstream channel is corrupted and to be able to switch the frequency at which data is transmitted in the upstream direction to an unused but clearer upstream channel. How this is done while having no impact on the normal transmission of data over an active channel is now described.

A spectrum assessment receiver and an upstream impairment detector 20 is utilized to analyze reference signals from cable modem 14 which are generated by a reference signal generator 22 after cable modem 14 has been polled by the system. Modem polling is accomplished by a modem-polling unit 24 which causes polling signals to be sent in the downstream direction to a cable modem tap over traditional DOCSIS downstream channels. The polling signal is detected at 26 and is utilized at 28 to retune the cable modem to an unused channel, whereupon a reference signal is transmitted back along a return path 30 through an RF matrix switch 32 to receiver 20.

Switch 32 is controlled such that it optionally connects the expected channel to a vector signal analyzer 34 which is coupled to receiver 20 to be able to analyze the noise and other factors in the selected unused upstream channel.

The use of spectrum analysis and other techniques within receiver 20 permits ascertaining the amount of noise and signal distortion impairments on the upstream path. While active channel impairments can be measured directly from the signal on it, other techniques are required to measure the quality of an unused upstream channel such as described in the aforementioned patent applications. It will not be immediately apparent from measurement of the characteristics of an active channel what the quality of an unused channel will be and usually there is no correlation. Rather the measurements involved in measuring the unused channel are either the error vector magnitude or the mean square error which includes such effects as ingress noise and signal distortion including amplitude and phase distortion, group delay and microreflectivity.

After the selected cable modem has been made to retune to one or more unused channels and after the quality of the unused channel is determined by the injection of the reference signal and the measurement of the result at the receiver 20, receiver 20 upon assessment of an appropriate channel to hop to, instructs the selected modem to retune to the best unused channel as established, in one embodiment, by the worst tap. It will be appreciated that a channel assessment table 38 is provided which contains a prioritized list of the best, cleanest unused channels, with the spectrum assessment receiver being used to build this table.

It will be appreciated that selecting the worse tap and finding the best upstream channel means that the majority of the modems coupled to the cable modem termination system can safely signal over this unused channel since the taps for these modems will be better taps than those at which the measurement were made.

In order to select the worse tap, a table 40 is continuously updated from information from receiver 20, and at the time modems are to be polled, the table is queried by polling unit 24 to ascertain the tap with the worst history of quality transmissions.

In so doing it is possible to continuously measure the upstream or return path in the "background" while active channels are in use in the upstream direction. Thus the impact of continuous monitoring of the upstream channel is minimal and data rates can be preserved. This is unlike prior systems in which data interruption is to occur and only spectral noise is measured, not signal distortion.

Figure 2:
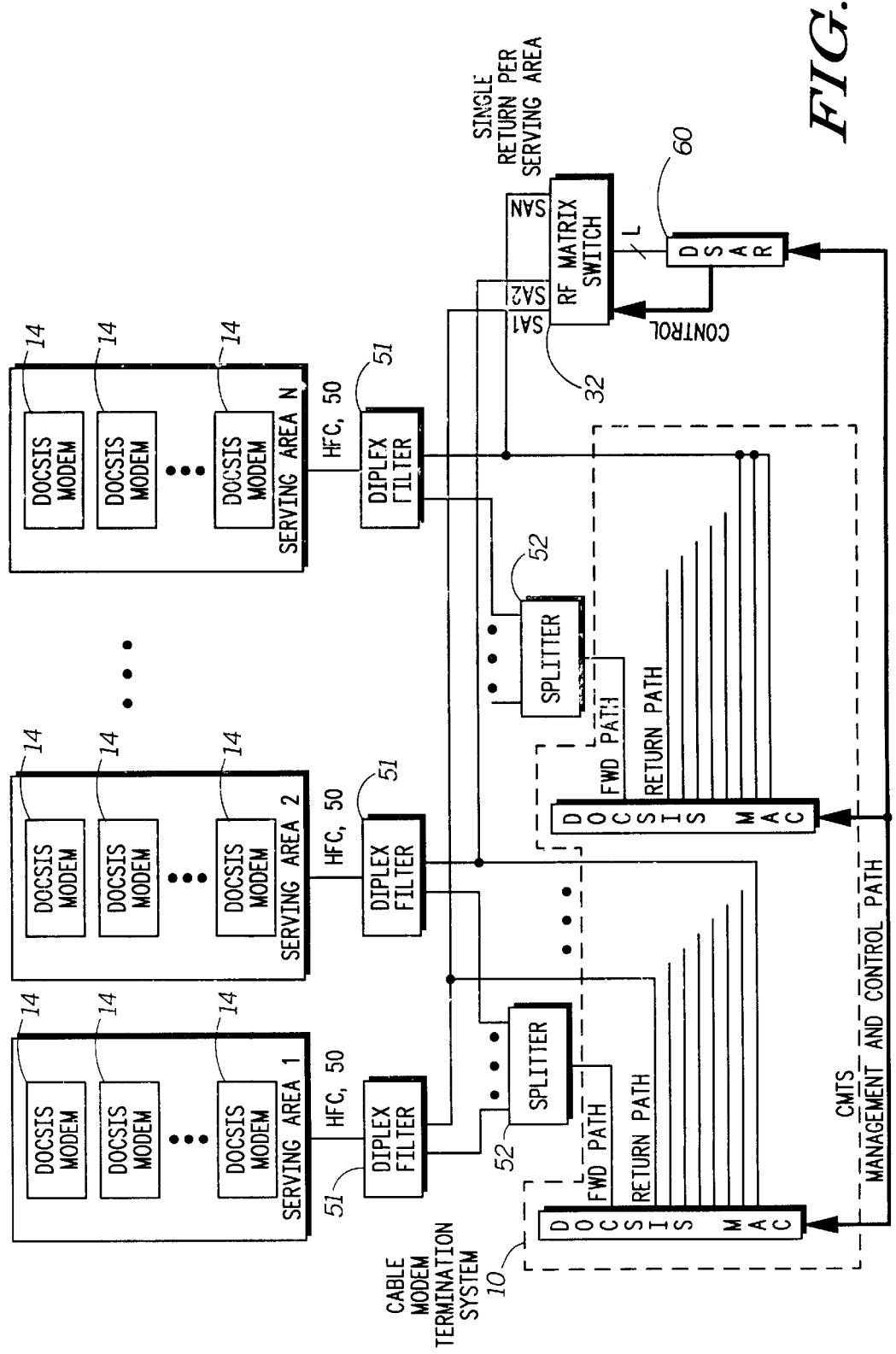
FIG. 2 is a block diagram of an implementation of the subject system utilizing a parallel receiver to perform return path spectrum monitoring functions.

More particularly, the subject invention employs an architecture for managing the return-path spectrum of a DOCSIS compliant cable data system. The invention also leverages the DOCSIS protocol, and DOCSIS modems within the cable plant to perform spectral assessments. The invention, as shown in FIG. 2, functions as follows. As described within the DOCSIS specification, the transmission path over the cable system is realized at the headend by cable modem termination system 64 and at each customer location by a DOCSIS modem 14. The cable plant is composed of either an all-coaxial or hybrid-fiber/coax cable network 50, having corresponding diplex filters 51 and splitters 52. Cable modem termination system 64 may be configured for one or more physical serving areas. As shown in FIG. 2, a DOCSIS serving area is serviced by one cable modem termination system downstream transmitter and one or more cable modem termination system upstream receivers. FIG. 2 illustrates N serving areas within the cable modem termination system. Serving areas 1 and 2 are serviced by one receiver and service area N is serviced by three receivers.

The description given up to this point represents a traditional DOCSIS implementation. In order to monitor the return-path spectrum and optimize the utilization of the return-path, the system must monitor the quality for both noise power and signal distortion aspects in order to properly assign frequency regions, modulation types, and symbol rates in an effort to maximize the available upstream bandwidth. This monitoring function is performed by a parallel receiver the DOCSIS spectrum assessment receiver or DSAR 60 which may contain one or more parallel receivers with L receivers shown in FIG. 2 to service/support the entire cable modem termination system. Receiver 60 is connected to the cable network via a programmable RF matrix switch 32 which allows the receiver 60 to select which serving area to be observed. Note, that the DOCSIS protocol is a TDMA approach with very tight coupling between the downstream and upstream data paths. However, the approach, described herein, functions within this DOCSIS protocol.

Each DOCSIS modem registers and continually provides data services to a customer as described within the DOCSIS specification. In addition, when it is not providing customer data services and when receiver 60 requests, the DOCSIS modem provides the necessary reference signal to support signal distortion measurements and other plant characterizations. The functionality to transmit a reference signal from the modem to the cable modem termination system is not a part of the DOCSIS specification but is allowed via the vendor TLV extensions within the specification. During typical operation, DOCSIS cable modems register and provide customer data services on specific frequencies, called active channels, within the return-path. There are other available portions of the return-path which are not being utilized during a given time period called passive spectrum or unused channels.

While the cable modem termination system receiver 64 can perform a number of measurements relative to the active channel including spectral noise density and signal distortion characteristics, it cannot, without impacting data services, monitor the other non-utilized regions of the spectrum. In order to monitor other spectral regions, the cable modem termination system receiver would have to terminate data passing, retune to other portions of the spectrum to perform measurements, and finally retune to the original active channel and resume data passing.

Tuning to other portions of the spectrum and performing measurements can consume significant amounts of time and have serious affects on the data passing functions of the DOCSIS system. Specifically, the receiver tuning process itself takes some time, but the greater impact results from being required to wait for a modem to tune to the alternate channel to transmit the reference signal. DOCSIS provides for in excess of 100 milliseconds for this retune time. Therefore, evaluation of 100 channels, a reasonable number to support the evaluation of a 4 MHz portion of the return-path spectrum, would result in a total loss of upstream data passing for more than 10 seconds.

Figure 3:
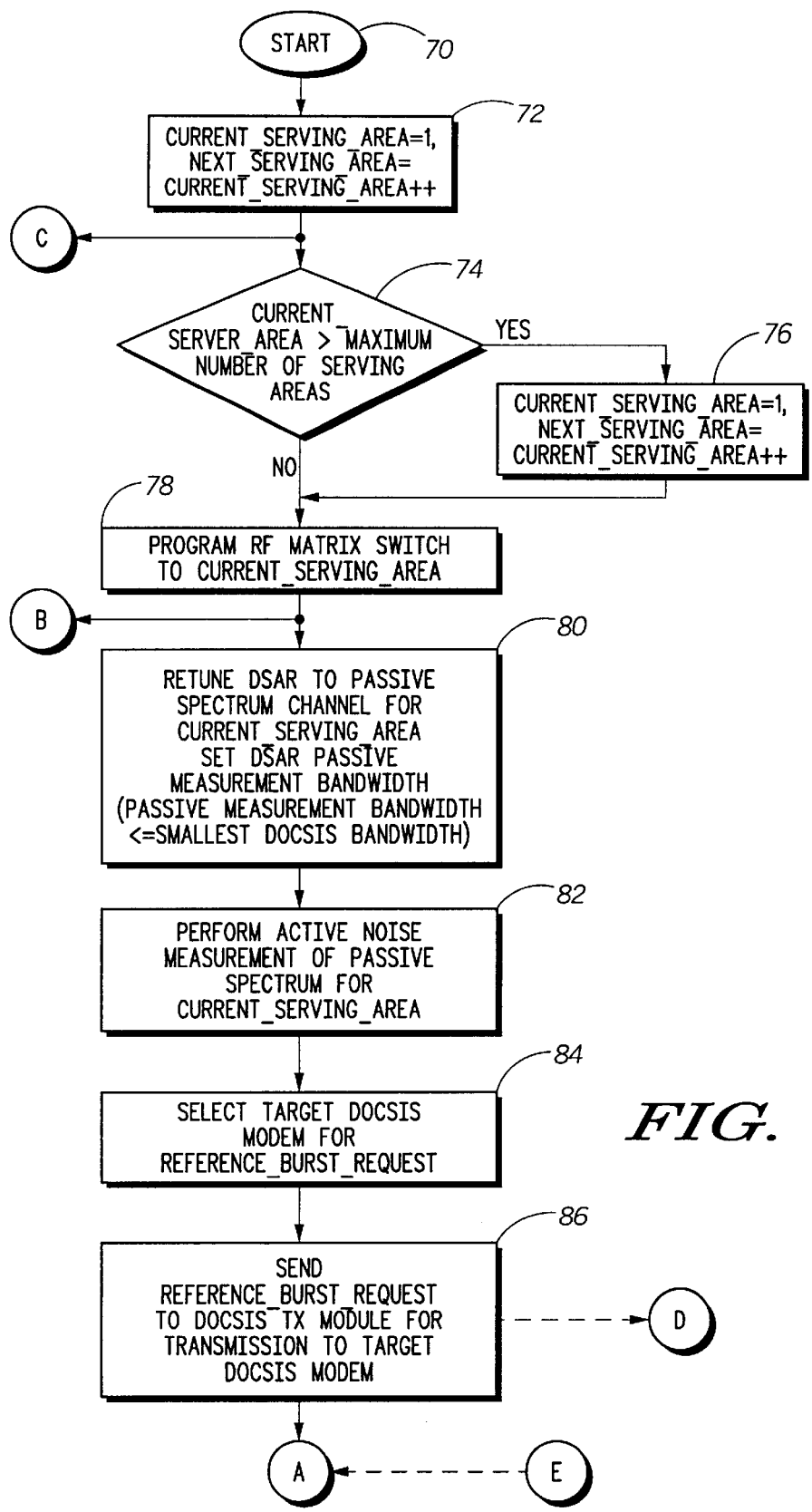
FIG. 3 is general process flow chart for a DOCSIS spectrum assessment receiver and target modem indicating an overview of the sampling process in terms of the generation and transmission of reference burst requests; and, FIG. 4 is flow chart showing the cable modem termination system module process flow and a DOCSIS spectrum assessment receiver in a flow diagram indicating a hopping scenario once a degraded active channel has been ascertained.

While the DOCSIS receiver could perform only a noise power measurement and thus bypass the need to have a DOCSIS modem retune to the alternate channel, this measurement omits the critical signal distortion assessments critical to support higher order modulation rates. The system shown in FIG. 2 allows the receiver 60 to monitor those unused portions of the spectrum while the cable modem termination system receiver 64 is servicing data from modems. FIG. 3 provides a general flow diagram of the processes running on the DOCSIS spectrum assessment receiver and DOCSIS modem. In general, the process is as follows: As seen by blocks 70–78, the DOCSIS spectrum assessment receiver programs the RF Matrix Switch to the desired serving area of the cable plant and tunes at block 80 to a nonactive region of the upstream spectrum where active noise measurements are to be performed for a given area as shown by block 82. The DOCSIS spectrum assessment receiver then selects a specific DOCSIS modem for transmitting the reference signal on the upstream as illustrated by block 84.

Selection of the modem is based upon two factors: 1) modem service activity, and 2) tap location. It is desirable to utilize the modem connected to the worst-performing tap in the serving area to assess signal distortion characteristics. This is done by having the DOCSIS spectrum assessment receiver maintain a table of all modems in the serving area in the increasing order of tap location performance. Characterization of the tap performance is now described:

Tap Performance

The selection process for statistically determining the likely worst performing tap locations in one embodiment is a two-step process as follows: First, using the DOCSIS Ranging information, specifically the timing offset adjustment, the parallel receiver can identify the cable modems which are located in the furthest amplifier section away from the head-end CMTS receiver. The distance from the CMTS to the modem is directly proportional to the ranging timing offset. In addition, amplifier stages add significant delays beyond traditional propagation affects. Given the resolution of the DOCSIS ranging timing accuracy, it may not be possible to differentiate between modems in adjacent homes; however, this step will yield a group of modems which are located at the furthest amplifier section.

The second step is to now compare the transmit levels from the cable modems selected from the amplifier section that is the furthest away from the head-end CMTS receiver. The cable modems that are located at the lower value taps will also have a lower transmit level than the cable modems located at the higher tap values. It is these modems at these lower value taps which will exhibit the worst performance. Therefore, the selection process is to locate the lowest transmit level cable modems with the largest ranging timing offset adjustment as the likely worst-case performance taps.

The rationale for the comparison of the transmit levels is as follows: All Cable TV Networks or plants are laid in such a manner that the largest value directional coupler tap is closest to the amplifier section and the lowest tap values are the furthest away from the amplifier section. This is done in an attempt to normalize the Forward Path Loss to be similar at the output of all directional couplers taps on a given coaxial cable distribution. This normalization or optimization is achieved by starting at the highest value tap and then decreasing in tap value to match the highest forward path frequency of interest to be equal at the output of each tap value. Therefore, both the tap value and spacing between taps is calculated as a function of the forward path coaxial cable loss. Such is not the case for the return path signals that do not exhibit the same loss over any coaxial section as the forward path. Given the reality that the return path loss is not identical to the forward path loss, the return path cable modem transmitter must transmit at a lower and lower level as the tap values decrease. Given the fact that the cable modem transmit level is lowest from the lower tap values, it also can be stated that the cable modem signal-to-ingress noise ratio and signal-to micro-reflection ratio originating from these taps is the poorest as the cable modem signal level is closer to any ingress noise event or micro-reflection that may occur in the vicinity of the low loss directional couplers used at the end of a coaxial run.

Alternatively, a second two-step approach can be used without the need of having the DOCSIS ranging information. The technique is to simply request that the cable modem transmit on the highest frequency allowable to determine which cable modems are located the furthest away from the Head-end Receiver. In this case the receiver first estimates the SNR from the cable modem in question, given no equalizer in the demodulator circuitry and records the value. Next, the receiver enables a multitap equalizer and records the resulting SNR for a second transmission. Given the fact that the parameter of interest for selecting the worst performing tap is primarily group delay, the equalized SNR for such a tap will be dramatically better than the unequalized SNR. The goal within this step is to identify the modems where the greatest improvement in SNR is achieved with the equalizer. These modems are located at the worst performing tap. Step 2 for this alternate approach is identical to the first approach given above whereby the modems identified in step 1 are ranked relative to upstream transmit power level. The modem transmitting at the lowest level is the modem to be used to transmit the reference signal.

The rationale for this alternative approach is as follows: It is commonly understood that an equalizer is designed to minimize group delay and amplitude distortion. By identifying the cable modem which exhibits the greatest improvement in SNR when an equalizer is enabled, we are affectively identifying the cable modem with the greatest group delay/amplitude distortion. The modem with the greatest group delay/amplitude distortion results because it is located the deepest in the plant, i.e., it's return path signal must pass through more Diplex filters than any of the other modems. Each Diplex filter has an additive effect on the group delay. At the high end of the frequency spectrum, i.e., at the point where the filter begins to roll off, this affect is the most pronounced. This approach has therefore achieved the same results as utilizing the DOCSIS ranging timing offset without the need for such a parameter.

Note, the SNR assessment may be performed at modem registration and may be refreshed at relatively sparse intervals. It is important that the SNR metric be maintained for a common set of upstream parameters in that one does not store SNR values for some modems at one frequency and modulation and other modems at another.

It is expected that the tap performance list will be built and maintained as each modem registers and deregisters. Ideally, the DOCSIS spectrum assessment receiver would select the modem with the worst performing tap. However, if the modem is actively providing services to a user, then the DOCSIS spectrum assessment receiver selects the next worst-case modem from the list. Note, the cable modem termination system module can provide an indication of current service activity for the modems.

Polling

The DOCSIS spectrum assessment receiver then sends a "reference signal request" as illustrated at block 86 via the DOCSIS downstream to a specific modem identified as the worst performing tap. The "reference signal request" contains the desired characteristics of the upstream transmission the modem must send, including such parameters as modulation type, upstream frequency, and symbol rate.

The DOCSIS modem will receive the request as shown at block 88 and if not busy as determined at 90 will service the request by retuning at block 92 and transmitting at block 91 the desired signal on the upstream. Iteratively there is a retune to the DOCISIS upstream channel at 96 and an ability to ignore a request at 98, at which the system is returned to normal service at 100. While it is unlikely that this DOCSIS modem is actively providing data passing services since it was selected based upon this criteria, it is possible that other data will have arrived from an alternate data port prior to servicing the reference signal request.

Note, the DOCSIS protocol would typically require that an upstream burst be sent to a cable modem termination system receiver within some very tight timing constraints subject to upstream channel descriptors or UCDs, timing maps or MAPs, and ranging parametrics which essentially eliminates the burst acquisition process. However, since the receiver is not a DOCSIS cable modem termination system receiver, these tight timing constraints are not an issue. This is because the modem uses a longer preamble to allow the non-DOCSIS receiver to acquire the burst.

The DOCSIS spectrum assessment receiver is functioning in a polled type of approach where it waits as illustrated at 102 for the upstream burst to occur after the "reference signal request" is made to the modem. By using this polled approach, two critical goals are achieved. First, the DOCSIS spectrum assessment receiver is not dependent upon the DOCSIS cable modem termination system timing, and secondly, if the modem is suddenly tasked to provide data services before it can send the "reference signal", it may prematurely cancel the "reference signal request" and immediately return to passing data, thus having little or no affect on data service. The likelihood of this situation has been greatly reduced during the DOCSIS modem selection process.

In the case when a DOCSIS modem cancels or fails to respond to the "reference signal request", the DOCSIS spectrum assessment receiver will time-out on that request as illustrated at 104 and move on to other measurements, either in other portions of the plant or from other modem sources. Note that after timeout 104 the spectrum table is updated at 106 either by the timeout or by measured metrics at 106. Blocks 110–116 relate to additional passive spectrum measurement.

Upstream Channel Monitoring

The DOCSIS spectrum assessment receiver can perform spectral noise measurements on non-active channels even while the DOCSIS receiver is providing data services to all modems without resulting in any data impacts. Since the distortion impacts of the plant are unique to the tap where the modem is located, allowing DOCSIS modems to respond with reference signals gives the greatest insight into plant performance issues. If instead, the system relied on non-DOCSIS modem transmitters for these reference signals, then such issues as how many reference transmitters and where they should be located would dramatically impact the visibility into the plant characteristics.

Two critical features of this approach should be pointed out. First, by allowing the DOCSIS spectrum assessment receiver to select the parameters of the upstream reference transmission, SNR measurements of bandwidths narrower than that allowed by DOCSIS may be performed, assuming the modem source is capable of it. By appropriately "combining" a series of measurements, the DOCSIS spectrum assessment receiver is capable of assessing spectral quality with both a high degree of frequency fidelity and bandwidth agility while minimizing the number of measurement which must be made, thus accelerating the speed at which spectral assessments may be completed. Secondly, while this approach relies on DOCSIS modems as the transmit source for the upstream, these modems will continue to monitor the downstream RF as well as its other data ports. This maximizes the performance of the modem in that no data is missed and continued monitoring of the downstream and processing of MAPs, UCDs, etc. allows a rapid return to data passing when required.

Figure 4:
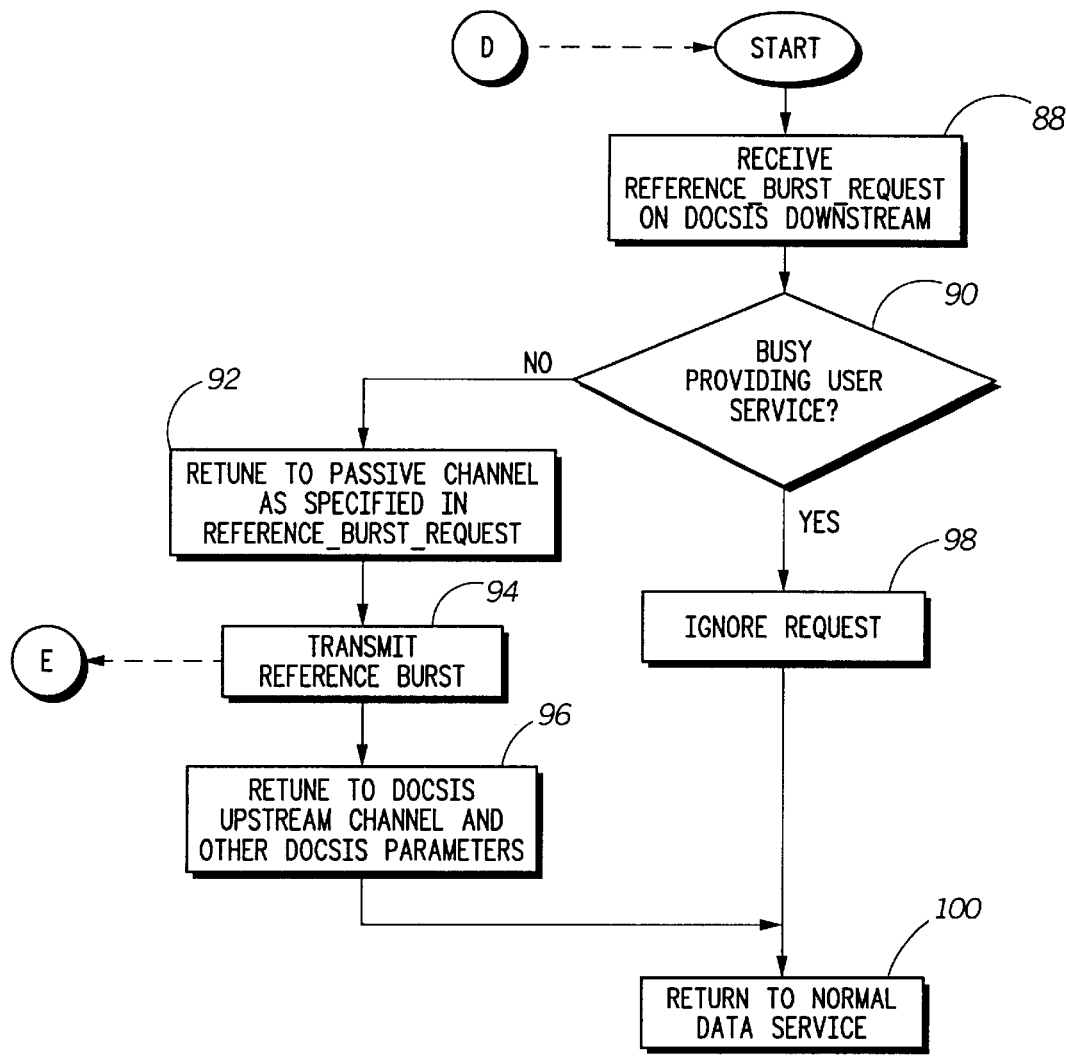
Figure 5:
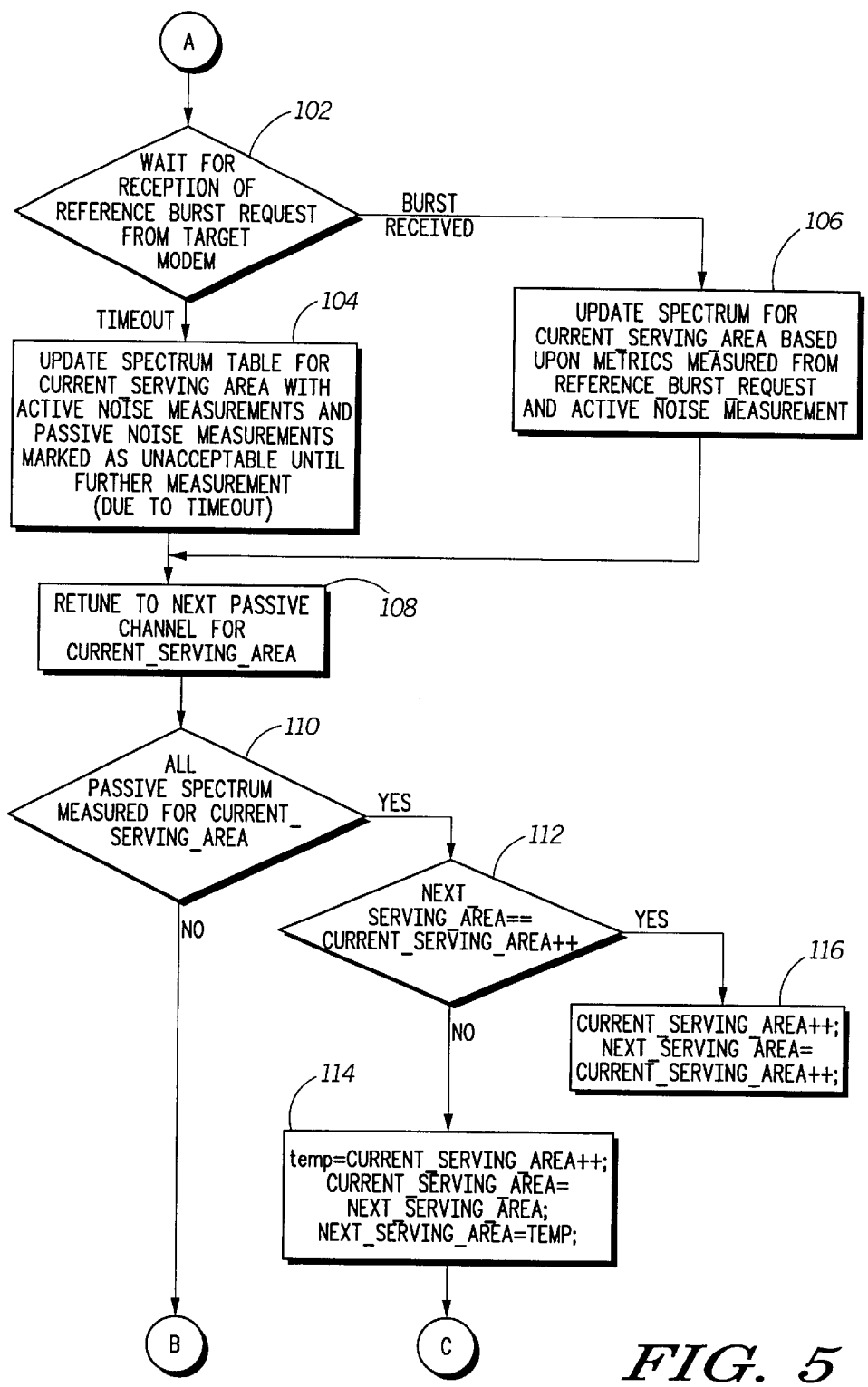
FIG. 5 is a general process flow chart for a DOCSIS spectrum assessment system indicating an overview of the process in terms of receiving reference bursts from a selected DOCSIS modem, updating a table of measurement metrics, and progressing through all spectrum and serving areas.
Figure 6:
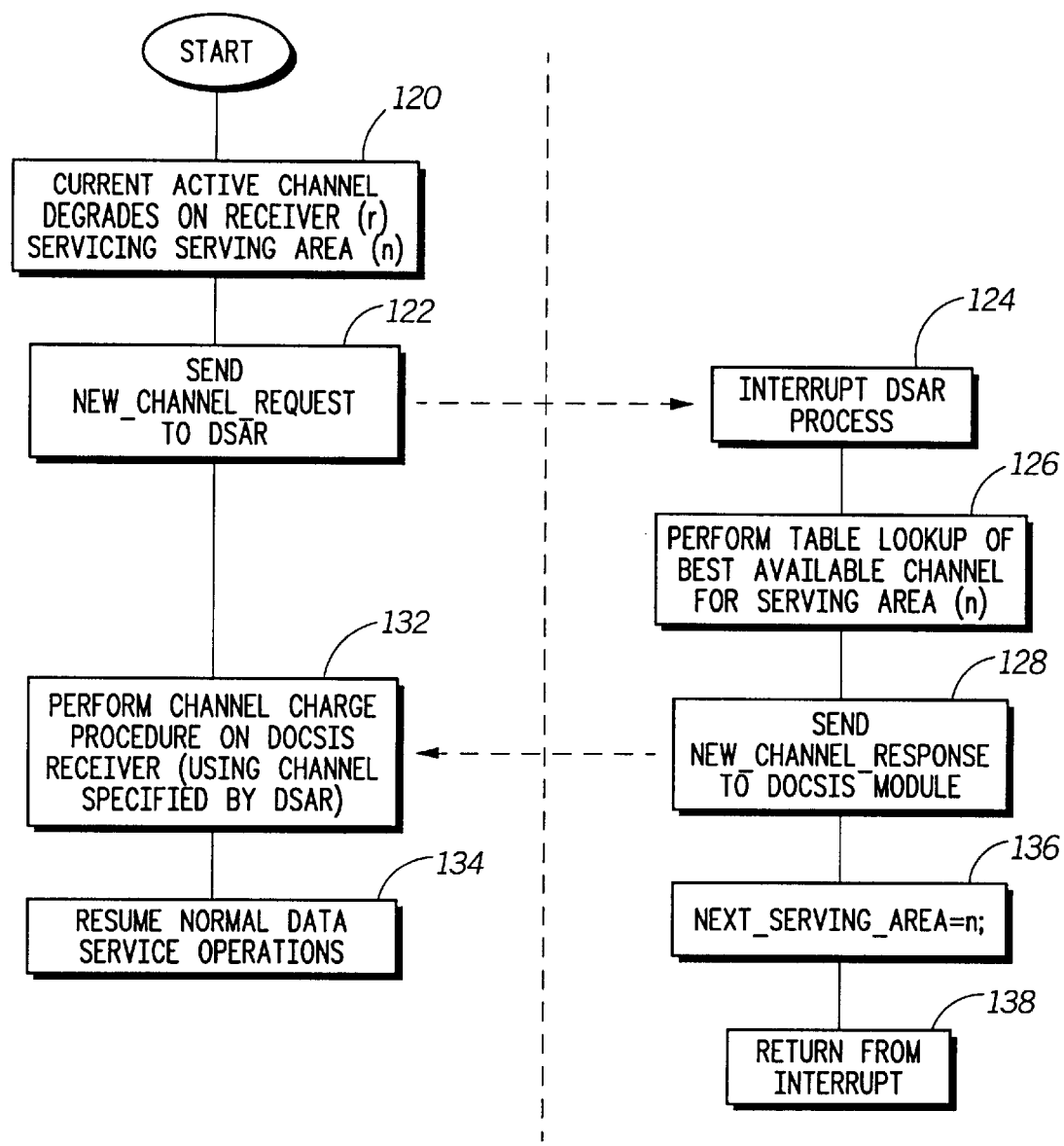
FIG. 6 is a flow chart showing the cable modem termination system module process flow and a DOCSIS spectrum assessment receiver indicating a hopping scenario once a degraded active channel has been ascertained."

The process is very simple for the cable modem termination system module as illustrated in FIG. 4. When the cable modem termination system module detects a degrading active channel, as illustrated at 120, it immediately requests a new channel at 122 from the DOCSIS spectrum assessment receiver. The DOCSIS spectrum assessment receiver interrupts its processing at 124, performs a table lookup of the best available channel at 126 and responds at 128 with the best channel and accelerates the priority of that serving group for a new spectral assessment. The channel change is performed at 132 and normal data service operations are resumed at 134. Thereafter the next serving area is addressed at 136 and there is a return from interrupt at 138.

The subject system thus provides the unique capability to monitor the return path portion of the spectrum of a DOCSIS cable data system without impacting the data services provided to paying customers. If the more straightforward technique of using a cable modem termination system receiver is chosen, then significant data servicing impacts will occur. Further, if a channel degrades and no effort is made to assess the upstream spectrum prior to moving to a new channel, then the system risks potentially catastrophic problems beyond data loss such as mass deregistration. One other unique aspect to the subject method is the fact that it leverages the existing DOCSIS protocol. Specifically, DOCSIS cable modems are used to transmit the reference signals and the DOCSIS downstream communication channel is used to relay the request from the DOCSIS spectrum assessment receiver to the modem. This minimizes costs of new cable infrastructure required to support the return-path spectrum management function while all but eliminating the impacts on the function of data through-put.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. In a cable modem system, a method for performing spectrum management to reassign a degraded active upstream channel to an unused upstream channel having superior transmission characteristics comprising the steps of:
    monitoring the quality of an unused upstream channel in the background during the transmission of data on an active upstream channel;
    establishing the best of the unused upstream channels from the monitored quality thereof; and,
    switching the data on the degraded channel to the best of the unused upstream channels,
        wherein the monitoring step includes selecting a modem, retuning the modem to one of the unused channels, and transmitting a reference signal in the upstream direction,
        wherein said monitoring step includes analyzing the channel with the reference signal for upstream channel quality,
        wherein the monitoring step includes polling modems at taps on the cable by selecting a modem to transmit the reference signal,
        wherein the modem selected is at a tap location exhibiting the worst quality connection.

2. The method of claim 1, wherein the monitoring step includes the step of keeping a table of tap quality to permit selection of a modem at the tap location exhibiting the worst quality connection.

3. The method of claim 1, wherein quality is measured as both a function of noise sources and signal distortion characteristics.

4. The method of claim 1, wherein the polling includes a reference poll request and wherein the reference poll request is issued over the traditional downstream communications channel, whereby the reference signal transmission on the unused channel does not require the tight time coupling of the traditional return-path TDMA approach.

5. The method of claim 1, wherein the modem has a data port and wherein the modem continues to monitor all of its data ports including the port associated with the downstream channel which prevents missed data and supports quick return to data passing by continual monitoring of the TDMA upstream timing characteristics available in accordance with the DOCSIS protocol.

6. In a cable modem system, a method for performing spectrum management to reassign a degraded active upstream channel to an unused upstream channel having superior transmission characteristics comprising the steps of:
    monitoring the quality of an unused upstream channel in the background during the transmission of data on an active upstream channel;
    establishing the best of the unused upstream channels from the monitored quality thereof; and,
    switching the data on the degraded channel to the best of the unused upstream channels,
        wherein the monitoring is done on a continuous polled basis in which cable modems at taps along the cable are sequentially polled,
        wherein each of the polled modems is directed to retune to an unused upstream channel and transmit a reference signal in the upstream direction for use in the monitoring,
        wherein a selected modem is directed to sequentially retune to a plurality of different unused upstream channels and to provide the reference signal on each of the different unused upstream channels such that the tap to which the modem is connected can be monitored for the quality of a plurality of unused upstream channels.

7. In a cable modem system, a method for performing spectrum management to reassign a degraded active upstream channel to an unused upstream channel having superior transmission characteristics comprising the steps of:
    monitoring the quality of an unused upstream channel in the background during the transmission of data on an active upstream channel;
    establishing the best of the unused upstream channels from the monitored quality thereof; and,
    switching the data on the degraded channel to the best of the unused upstream channels,
        wherein the monitoring is done on a continuous polled basis in which cable modems at taps alone the cable are sequentially polled,
        wherein the characteristics of the reference signal to be transmitted by the modem are contained in the reference poll,
    wherein the characteristics include modulation type, symbol rate, transmit data stream, scrambling enabled/disabled, preamble acquisition string, and actual data payload stream.

8. In a cable modem system, a method for performing spectrum management to reassign a degraded active upstream channel to an unused upstream channel having superior transmission characteristics comprising the steps of:
    monitoring the quality of an unused upstream channel in the background during the transmission of data on an active upstream channel;
    establishing the best of the unused upstream channels from the monitored quality thereof; and,
        switching the data on the degraded channel to the best of the unused upstream channels,
            wherein the monitoring step includes selecting a modem, retuning the modem to one of the unused channels, and transmitting a reference signal in the upstream direction,
            wherein said monitoring step includes analyzing the channel with the reference signal for upstream channel quality,
            wherein the monitoring step includes polling modems at taps on the cable by selecting a modem to transmit the reference signal,
            wherein the modem selection is based upon historical modem service activity, with modems currently being tasked to provide data services not being selected.

9. In a cable modem system, a method for performing spectrum management to reassign a degraded active upstream channel to an unused upstream channel having superior transmission characteristics comprising the steps of:
    monitoring the quality of an unused upstream channel in the background during the transmission of data on an active upstream channel by selecting a modem, retuning the modem to one of the unused channels, and transmitting a reference signal in the upstream direction;
    establishing the best of the unused upstream channels from the monitored quality thereof; and,
    switching the data on the degraded channel to the best of the unused upstream channels,
        wherein said monitoring step includes analyzing the channel with the reference signal for upstream channel quality,
        wherein the monitoring step includes polling modems at taps on the cable by selecting a modem to transmit the reference signal,
    wherein the modem selected is at a tap location exhibiting the worst quality connection.

10. The method of claim 9, wherein the monitoring step includes the step of keeping a table of tap quality to permit selection of a modem at the tap location exhibiting the worst quality connection.

11. The method of claim 9, wherein quality is measured as both a function of noise sources and signal distortion characteristics.

12. The method of claim 9, wherein the polling includes a reference poll request and wherein the reference poll request is issued over the traditional downstream communications channel, whereby the reference signal transmission on the unused channel does not require the tight time coupling of the traditional return-path TDMA approach.

13. The method of claim 9, wherein the modem has a data port and wherein the modem continues to monitor all of its data ports including the port associated with the downstream channel which prevents missed data and supports quick return to data passing by continual monitoring of the TDMA upstream timing characteristics available in accordance with the DOCSIS protocol.

14. In a cable modem system, a method for performing spectrum management to reassign a degraded active upstream channel to an unused upstream channel having superior transmission characteristics comprising the steps of:
    monitoring the quality of an unused upstream channel in the background during the transmission of data on an active upstream channel by selecting a modem, retuning the modem to one of the unused channels, and transmitting a reference signal in the upstream direction;
    establishing the best of the unused upstream channels from the monitored quality thereof; and,
    switching the data on the degraded channel to the best of the unused upstream channels,
        wherein the monitoring is done on a continuous polled basis in which cable modems at taps along the cable are sequentially polled,
        wherein each of the polled modems is directed to retune to an unused upstream channel and transmit a reference signal in the upstream direction for use in the monitoring,
        wherein a selected modem is directed to sequentially retune to a plurality of different unused upstream channels and to provide the reference signal on each of the different unused upstream channels such that the tap to which the modem is connected can be monitored for the quality of a plurality of unused upstream channels.

15. In a cable modem system, a method for performing spectrum management to reassign a degraded active upstream channel to an unused upstream channel having superior transmission characteristics comprising the steps of:
    monitoring the quality of an unused upstream channel in the background during the transmission of data on an active upstream channel by selecting a modem, retuning the modem to one of the unused channels, and transmitting a reference signal in the upstream direction;
    establishing the best of the unused upstream channels from the monitored quality thereof; and,
    switching the data on the degraded channel to the best of the unused upstream channels,
        wherein the monitoring is done on a continuous polled basis in which cable modems at taps along the cable are sequentially polled,
        wherein the characteristics of the reference signal to be transmitted by the modem are contained in the reference poll,
        wherein the characteristics include modulation type, symbol rate, transmit data stream, scrambling enabled/disabled, preamble acquisition string, and actual data payload stream.

16. In a cable modem system, a method for performing spectrum management to reassign a degraded active upstream channel to an unused upstream channel having superior transmission characteristics comprising the steps of:
    monitoring the quality of an unused upstream channel in the background during the transmission of data on an active upstream channel by selecting a modem, retuning the modem to one of the unused channels, and transmitting a reference signal in the upstream direction;
    establishing the best of the unused upstream channels from the monitored quality thereof; and,
    switching the data on the degraded channel to the best of the unused upstream channels, wherein said monitoring step includes analyzing the channel with the reference signal for upstream channel quality,
wherein the monitoring step includes polling modems at taps on the cable by selecting a modem to transmit the reference signal,
wherein the modem selection is based upon historical modem service activity, with modems currently being tasked to provide data services not being selected.

* * * * *